United States Patent
Mitsumoto (10) Patent No.: US 8,717,455 B2
(45) Date of Patent: May 6, 2014

(54) IMAGE PROCESSING APPARATUS AND IMAGE PROCESSING METHOD

(75) Inventor: Shinichi Mitsumoto, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 13/086,682

(22) Filed: Apr. 14, 2011

(65) Prior Publication Data

US 2011/0292234 A1 Dec. 1, 2011

(30) Foreign Application Priority Data

May 26, 2010 (JP) .................................. 2010-120962

(51) Int. Cl.
*H04N 5/228* (2006.01)

(52) U.S. Cl.
USPC .................................. 348/222.1; 348/231.6

(58) Field of Classification Search
USPC .......................................... 348/222.1, 231.6
See application file for complete search history.

(56) References Cited

U.S. PATENT DOCUMENTS

| | | | | |
|---|---|---|---|---|
| 2007/0183765 A1* | 8/2007 | Imamura | ........................ | 396/55 |
| 2008/0181506 A1* | 7/2008 | Nishizawa | .................... | 382/190 |
| 2009/0022396 A1* | 1/2009 | Watanabe et al. | ............. | 382/167 |
| 2010/0103311 A1* | 4/2010 | Makii | ........................... | 348/369 |
| 2011/0026807 A1* | 2/2011 | Wang | .......................... | 382/154 |

FOREIGN PATENT DOCUMENTS

| | | |
|---|---|---|
| DE | 19853632 A1 | 7/1999 |
| JP | 2004-310686 A | 11/2004 |
| JP | 2006-067521 A | 3/2006 |

OTHER PUBLICATIONS

Aug. 10, 2011 European Search Report in European Patent Appln. No. 11163117.2.

* cited by examiner

*Primary Examiner* — Sinh Tran
*Assistant Examiner* — Jason Flohre
(74) *Attorney, Agent, or Firm* — Fitzpatrick, Cella, Harper & Scinto (57) ABSTRACT

The area of a subject image in an image is changed. The correction strength is determined based on the area-change amount between the area before the area change and that after the area change for the subject image whose area has been changed. A correction process is performed for the image in accordance with the correction strength.

13 Claims, 10 Drawing Sheets

IMAGE PROCESSING APPARATUS AND IMAGE PROCESSING METHOD

BACKGROUND OF THE INVENTION

1. Field of the Invention

The present invention relates to an image processing apparatus and image processing method and, more particularly, to an image processing apparatus and image processing method for performing an image process to reconstruct the composition of a captured image.

2. Description of the Related Art

The spread of digital cameras boosts the opportunity to capture still and moving images on travels, at events, and the like. However, when the user views a captured image, he may have a different impression between a capturing target during capturing and an image after capturing (to be referred to as a captured image). Under these circumstances, demand has arisen for an editing function of dividing a captured image into a region where an important subject is captured (to be referred to as an important-subject region) and a background region, transforming the important-subject region, and reconstructing the composition to generate an image as if the image were captured again.

For example, according to the invention disclosed in Japanese Patent Laid-Open No. 2006-067521 (patent literature 1), the region of a captured image is divided, and a blur corresponding to the distance is applied to each region using separately-obtained distance information. According to the invention disclosed in Japanese Patent Laid-Open No. 2004-310686 (patent literature 2), a hemispherical 3D virtual space is created from a captured image, and the model of each region is arranged in the virtual space so that the composition in the captured image can be changed.

By applying the invention in patent literature 1 or 2, the degree of blur or composition of a captured image can be corrected. However, applying the technique in patent literature 2 requires accurately constructing the 3D space. It is difficult to assemble this technique into a device such as a digital camera.

SUMMARY OF THE INVENTION

In an aspect, an image processing apparatus comprising: a changing section, configured to change an area of a subject image in an image; a determiner, configured to determined a correction strength based on an area-change amount between an area before an area change and an area after the area change for the subject image whose area has been changed; and a corrector, configured to perform a correction process for the image in accordance with the correction strength.

According to another aspect, an image processing method comprises: using a processor to perform the steps of: changing an area of a subject image in an image; determining a correction strength based on an area-change amount between an area before an area change and an area after the area change for the subject image whose area has been changed; and performing a correction process for the image in accordance with the correction strength.

According to these aspects, a correction process can be performed in accordance with a change of the composition of a captured image.

Further features of the present invention will become apparent from the following description of exemplary embodiments with reference to the attached drawings.

DESCRIPTION OF THE EMBODIMENTS

An image processing apparatus and image processing method according to embodiments of the present invention will now be described in detail with reference to the accompanying drawings. Although an example of processing a still image will be explained, the same process can also be applied to a moving image.

First Embodiment

[Arrangement of Apparatus]

Figure 1:
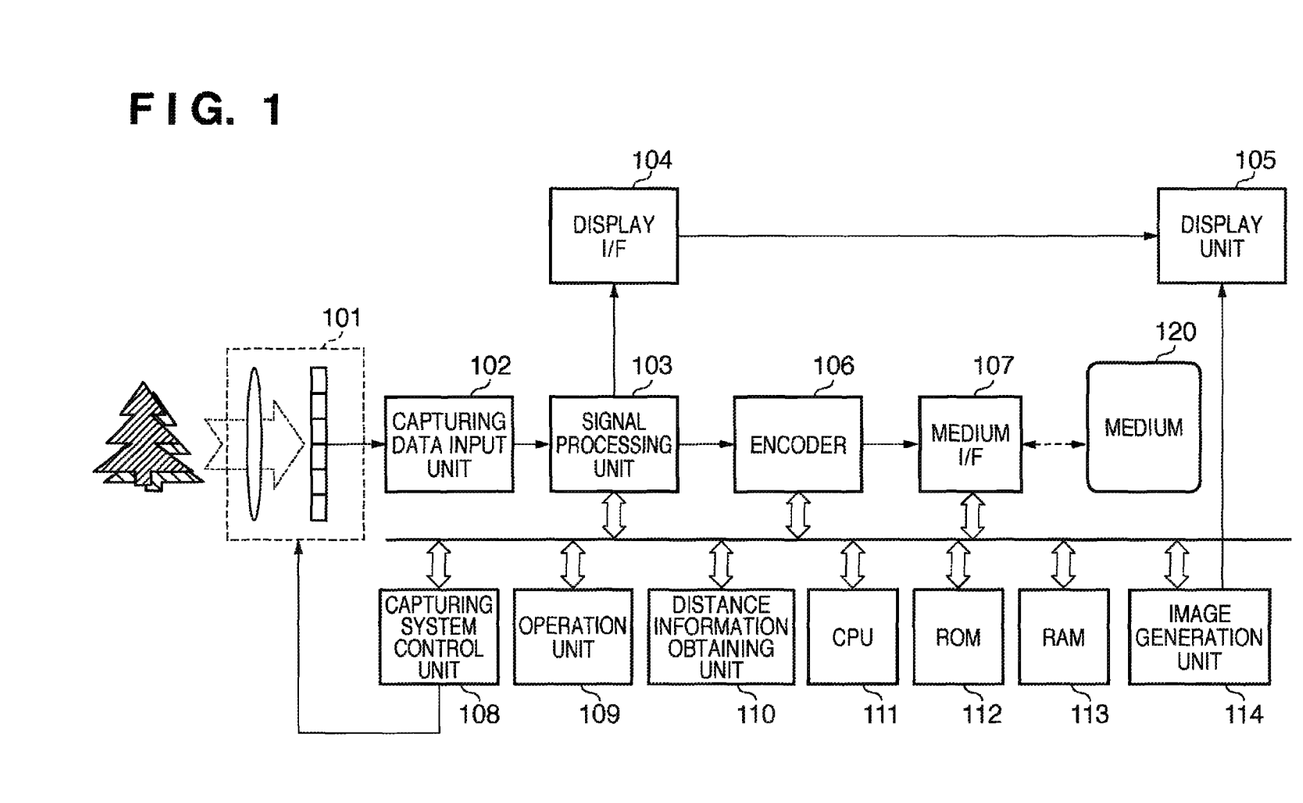
FIG. 1 is a block diagram for illustrating the arrangement of an image processing apparatus according to an embodiment.

The arrangement of an image processing apparatus according to the first embodiment will be described with reference to the block diagram of FIG. 1. An example in which the image processing apparatus according to the embodiment is assembled into a digital camera will be explained.

A microprocessor (CPU) 111 controls the following components by executing a program stored in a read-only memory (ROM) 112 using a random access memory (RAM) 113 as a work memory. The ROM 112 stores control programs and data for the camera, and programs and data for various processes.

A capturing unit 101 includes various lenses for zooming, focusing, and camera-shake correction, a stop, a shutter, an optical low-pass filter, an infrared cut filter, a color filter, and a sensor such as a complementary metal oxide semiconductor (CMOS) or charge coupled device (CCD). The capturing unit 101 detects the quantity of light traveling from a subject, and outputs an analog signal corresponding to the quantity of light.

A capturing data input unit 102 converts an analog signal input from the capturing unit 101 into a digital signal. A signal processing unit 103 performs various image processes, such as demosaicing, white-balance correction, and gamma correction for a digital signal input from the capturing data input unit 102, generating a digital image.

A display unit 105 such as a liquid crystal display (LCD) displays a digital image input via a display interface (I/F) 104, and displays various images including sign and character images which are input from an image generation unit 114. The display unit 105 may have a touch-screen function. In this case, the display unit 105 also functions as part of an operation unit 109 for inputting a user instruction.

An encoder 106 converts a digital image input from the signal processing unit 103 into compressed image data or video data of a format such as JPEG, MPEG, or H.264 in accordance with an instruction from the CPU 111. Image data or video data output from the encoder 106 is stored in a medium (for example, hard disk or memory card) 120 via a medium I/F 107 which controls read/write from/in the medium 120 mounted in the digital camera. Note that the medium I/F 107 also functions as an interface for connecting the image processing apparatus to a computer device (PC).

A capturing system control unit 108 controls the capturing unit 101 to, for example, adjust the focus, open/close the shutter, or adjust the stop in accordance with an instruction from the CPU 111. The operation unit 109 inputs a user instruction via an input unit such as a button, a mode dial, a switch, or the above-mentioned touch screen. User instructions regarding the zoom, focus, shutter speed, aperture value, and capturing mode can also be input via the operation unit 109. A distance information obtaining unit 110 includes a sensor for measuring the distance from the digital camera to a subject in capturing. Distance information measured by the distance information obtaining unit 110 is added to image data of a captured image or stored in the medium 120 in association with the image data.

Figure 2:
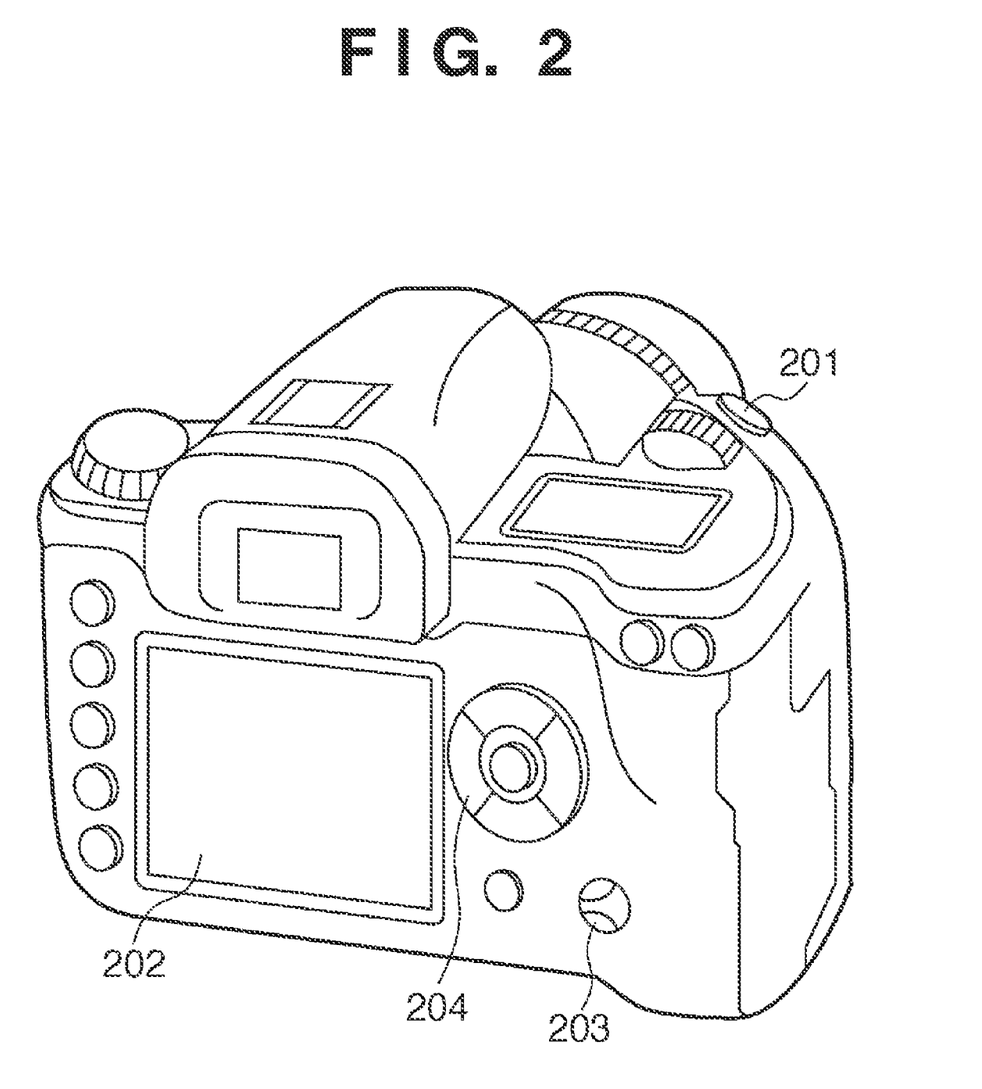
FIG. 2 is a perspective view for illustrating an example of a camera in which the image processing apparatus according to the embodiment is assembled.

The digital camera in which the image processing apparatus according to the embodiment is assembled will be exemplified with reference to FIG. 2.

A monitor 202 corresponds to the display unit 105, and displays an image and various kinds of information. In accordance with a user operation, the monitor 202 is used to display video captured by the capturing unit 101 or signs and characters which form a user interface, or play back and display-image data, video data, or the like stored in the medium 120.

A mode switch 203 is an input unit for switching the camera-operation mode. The user operates the mode switch 203 to switch the camera to, for example, a state (to be referred to as a capturing state) in which an image can be captured or a state (to be referred to as a playback state) in which a captured image or captured video is played back and displayed on the display unit 105. Note that playback display is not limited to the display unit 105 and can also be done using an external monitor via the medium I/F 107.

A four-way selector key 204 is an input unit which has four buttons arranged at the top, bottom, right, and left and a setting button arranged at the center, and designates selection or execution of a menu item or the like displayed on the monitor 202. The user operates the four-way selector key 204 for selection of a captured image to undergo playback display, selection of video, a fast-forward process, reverse playback, or the like.

A release button 201 is an input unit for designating focusing and capturing. When the digital camera is set in the still-image capturing mode, the user captures a still image by pressing the release button 201 in a non-capturing state. When the digital camera is set in the moving-image capturing mode, the user starts capturing a moving image by pressing the release button 201 in a non-capturing state, and ends the capturing by pressing the release button 201 in the capturing state.

[Image Process]

Figure 3:
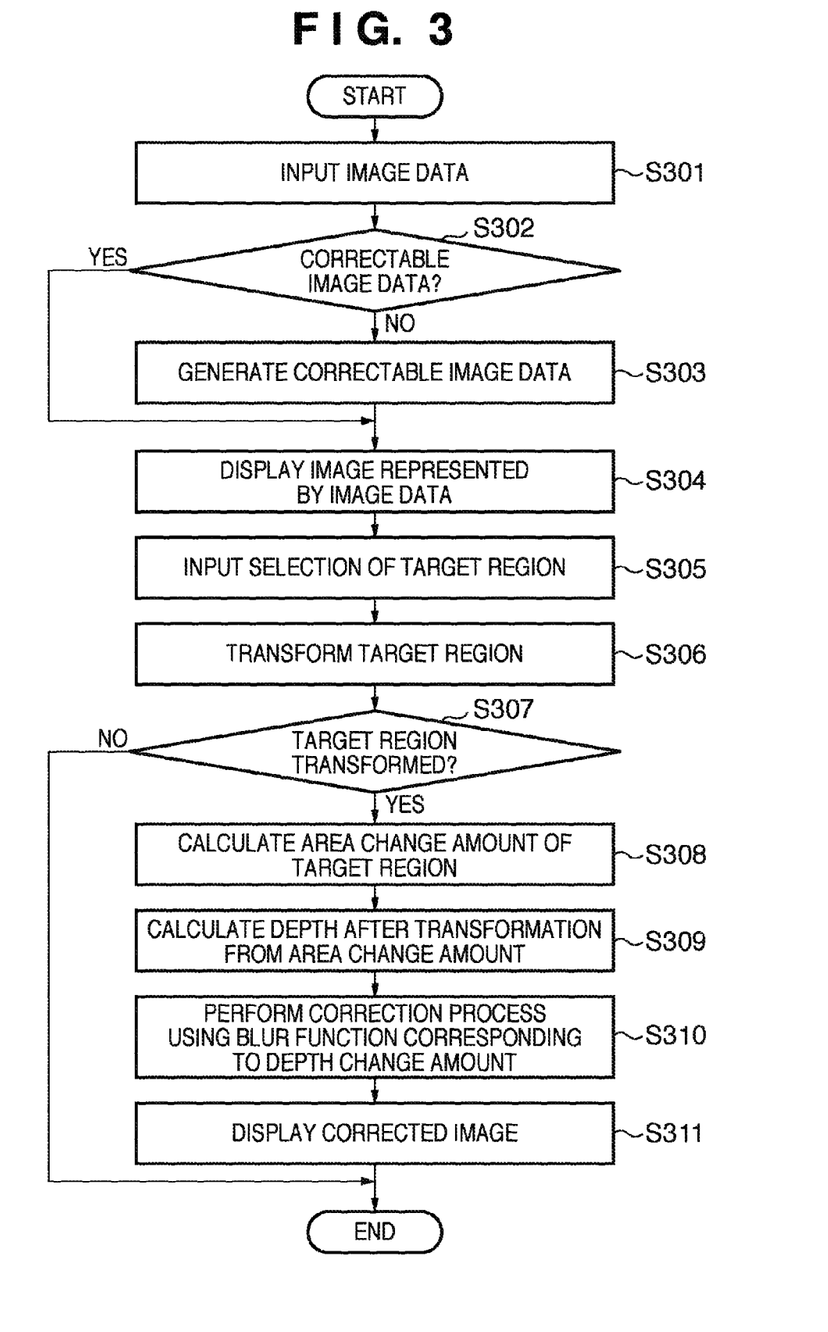
FIG. 3 is a flowchart for illustrating an image process according to the embodiment.

An image process in the embodiment will be exemplified with reference to the flowchart of FIG. 3. The CPU 111 executes this process when the camera is in the playback state and, for example, the user designates an image correction process via the operation unit 109.

In accordance with a user instruction, the CPU 111 inputs image data to be corrected among image data stored in, for example, the medium 120 (loads image data into the RAM 113) (step S301). The CPU 111 determines whether the input image data is correctable image data (step S302). If the input image data is uncorrectable image data, the CPU 111 divides an image represented by the image data into regions using distance information in capturing, generating correctable image data (step S303). Note that details of generation of correctable image data will be described later. The generated correctable image data can be stored in the medium 120 in association with the captured image. In other words, when correctable image data corresponding to image data designated by the user is stored in the medium 120 or the like, the CPU 111 can input the correctable image data.

If the selected image data is correctable or correctable image data is generated, the CPU 111 displays an image represented by the image data on the display unit 105 (step S304), and inputs a target region selected by the user (step S305). The user moves a cursor displayed on the image to, for example, the diagonal vertex of a region, and presses the setting button of the four-way selector key 204 to select the target region. At this time, the image generation unit 114 may color a transformable region or the selected region to assist the user operation.

Then, the CPU 111 transforms the target region (step S306), and determines whether the target region has been transformed (step S307). If the target region has not been transformed, the image process ends. Transformation of the target region will be described later.

If the target region has been transformed, the CPU 111 calculates the change amount of the area (to be referred to as area-change amount) of the target region (step S308). Based on the area-change amount, the CPU 111 calculates distance information (to be referred to as depth) in the direction of depth in the 2.5D space (step S309), details of which will be described later. Note that the expression "2.5D space" means adding the depth to a 2D image. After that, the CPU 111 sets a blur function corresponding to the change amount of the depth before and after the transformation process, and performs a correction process using the blur function (step S310). The CPU 111 displays the image having undergone the correction process on the display unit 105 (step S311). Image data of the corrected image may be stored in the medium 120 or output to a PC or the like.

Correctable Image Data

Figure 4:
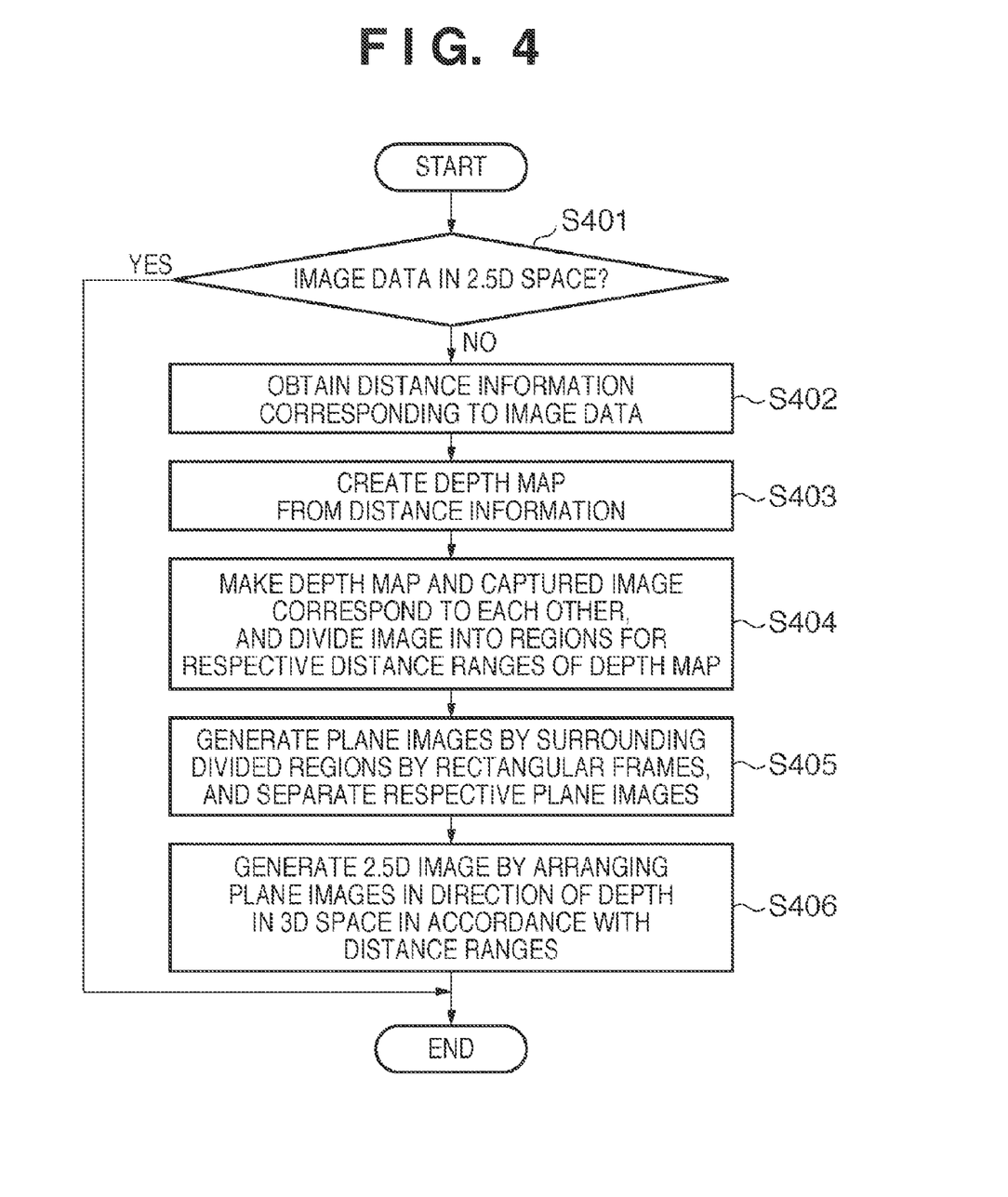
FIG. 4 is a flowchart for illustrating a determination of whether input image data is correctable image data, and generation of correctable image data.

A determination of whether input image data is correctable image data (step S302), and generation of correctable image data (step S303) will be explained with reference to the flowchart of FIG. 4.

The CPU 111 determines whether input image data is image data in the 2.5D space (step S401). If the input image data is image data in the 2.5D space, the CPU 111 determines that the input image data is correctable image data, and ends the process. Note that image data in the 2.5D space will be described later.

If the input image data is not image data in the 2.5D space, the CPU 111 obtains distance information indicating the distance between the camera and the subject in correspondence with the input image data (step S402). The CPU 111 normalizes the distance information based on shooting-distance ranges (to be referred to as distance ranges), and creates an image (to be referred to as a depth map) having three regions corresponding to the distance ranges (step S403). Note that the simplest distance ranges are three ranges such as a near distance (short range) of up to 5 m (inclusive), a middle distance (middle range) of 5 m (exclusive) to 500 m (inclusive), and a far distance (distant range) of more than 500 m. If necessary, the user can operate the operation unit 109 to set the number of distance ranges and the distance range of each range.

Figure 5A:
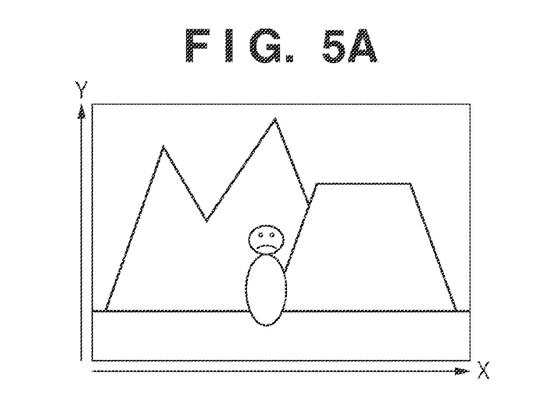
FIGS. 5A to 5D are views for illustrating the generation of correctable image data.
Figure 5B:
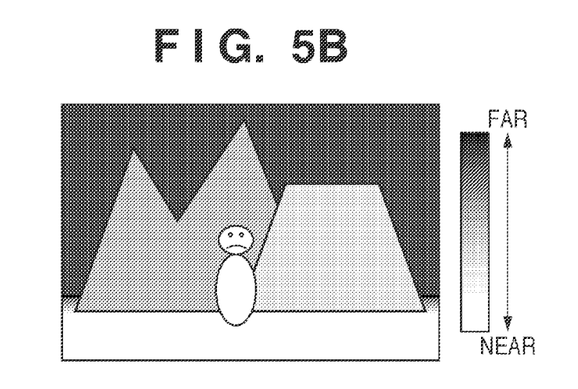

Generation of correctable image data will be explained with reference to FIGS. 5A to 5D. FIG. 5A exemplifies a captured image. FIG. 5B exemplifies a depth map corresponding to the captured image in FIG. 5A. In the depth map, the low-density region represents the short range, the intermediate-density region represents the middle range, and the high-density region represents the distant range.

Then, the CPU 111 makes the depth map and captured image correspond to each other, and divides the image into regions for the respective densities (distance ranges) of the depth map (step S404). At this time, the division precision can be increased by detecting image edges and performing region division based on the correspondence between the regions of the depth map and the detected edges.

Figure 5C:
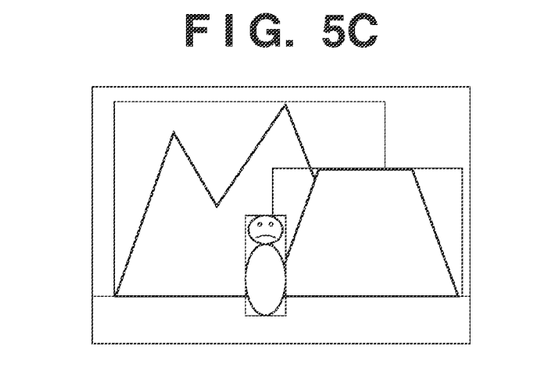
Figure 5D:
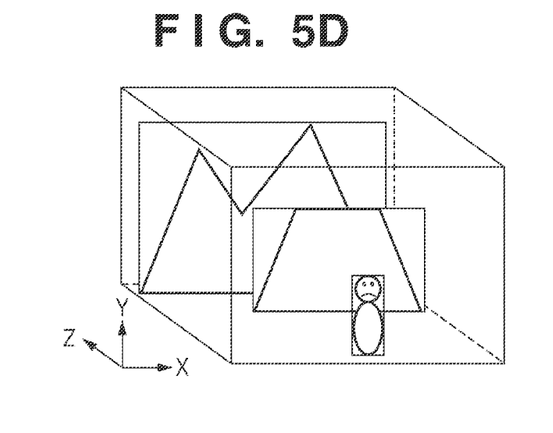

As shown in FIG. 5C, the CPU 111 generates plane images by surrounding the divided regions by rectangular frames, and separates the respective plane images (step S405). Note that the vertical and horizontal sides of the rectangular frame are parallel to those of the image, respectively. In FIGS. 5C and 5D, the solid line indicates the rectangular frame. However, the rectangular frame has a thickness of 0 and is invisible. In the separated plane image, a portion other than the divided region does not have data, and is set to be transparent by giving a pixel value indicating transparency or setting transparent data in the α channel.

As shown in FIG. 5D, the CPU 111 generates a 2.5D image by arranging the plane images in the direction of depth (Z-axis direction) in the 3D space in accordance with their distance ranges (step S406). The CPU 111 then ends the process. In this manner, image data obtained by arranging plane images in the 3D space (image data in the 2.5D space serving as a set of plane image data each having information indicating the depth (to be referred to as depth information)) is correctable image data. A 2D space (X-Y space) in which plane images have the same depth information will be called a layer.

Transformation of Target Region

Figure 6:
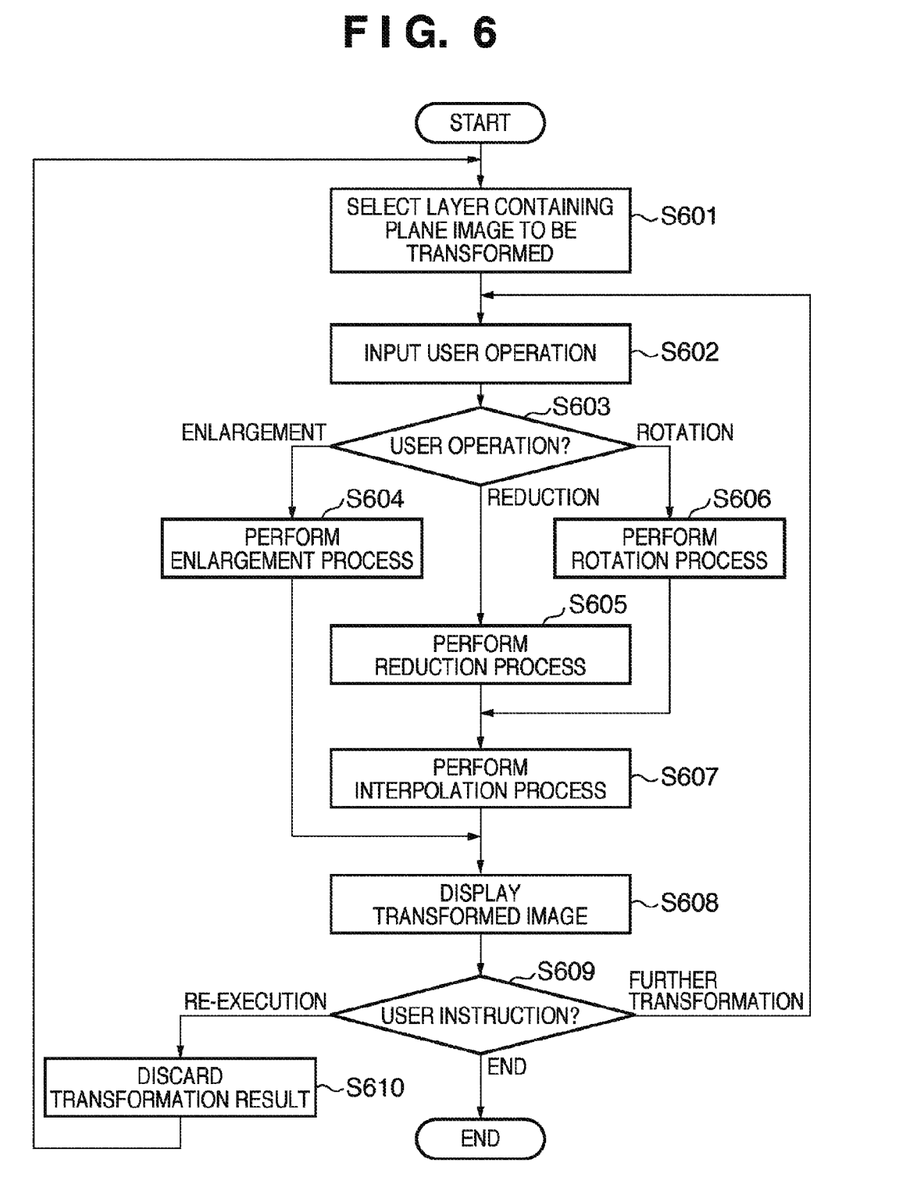
FIG. 6 is a flowchart for illustrating the transformation of a target region.

Transformation of a target region (step S306) will be explained with reference to the flowchart of FIG. 6.

The CPU 111 selects a layer containing a plane image to be transformed based on target region selection information (step S601), and accepts a user operation input from the operation unit 109 (step S602). The user can transform (enlarge, reduce, or rotate) a plane image contained in a selected layer by designating the transformation amount.

If the user designates enlargement or reduction, the CPU 111 changes the size of each plane image on the selected layer by the designated transformation amount while maintaining the aspect ratio. If the user designates rotation, the CPU 111 rotates each plane image of the selected layer at a designated angle (transformation amount) using the center of the entire captured image as the rotation axis. The CPU 111 then calculates the pixel value of each plane image after the transformation process. Note that the transparent portion of the plane image is kept transparent even after the transformation process for the plane image. The user can also designate the center of rotation.

The CPU 111 branches the process in accordance with a user instruction (step S603). If the user designates an enlargement process, the CPU 111 performs the above-described enlargement process (step S604). If the user designates a reduction process, the CPU 111 performs the above-described reduction process (step S605). If the user designates a rotation process, the CPU 111 performs the above-described rotation process (step S606). Note that the enlargement/reduction process employs a bilinear method, bicubic method, or the like, and the rotation process adopts affine transformation or the like.

If the reduction or rotation process is done, the CPU 111 performs a process of interpolating a blank portion which is generated by reducing or rotating the plane image of a selected layer and has lost pixel information (step S607). For example, the blank portion is interpolated using pixel information of a region close in spatial distance to the blank portion in the plane image of a layer other than the selected one. Alternatively, when image data to be corrected is one of successively captured photographic images or moving image frames, it is also possible to detect a region corresponding to the blank portion from photographic images or frames captured before and after capturing of the image data to be corrected, and interpolate the blank portion using pixel information of the detected region.

Thereafter, the CPU 111 displays the image having undergone the transformation process on the display unit 105 (step S608), and waits for a user instruction (step S609). If the user designates further transformation, the CPU 111 returns the process to step S602. If the user designates re-execution of transformation, the CPU 111 discards the transformation result (step S610), and returns the process to step S601. If the user designates the end of transformation, the CPU 111 ends the transformation process. Note that the CPU 111 can parallelly or alternately display images before and after the transformation process on the display unit 105 to present the transformation result (effect).

Calculation of Area-Change Amount

Figure 7:
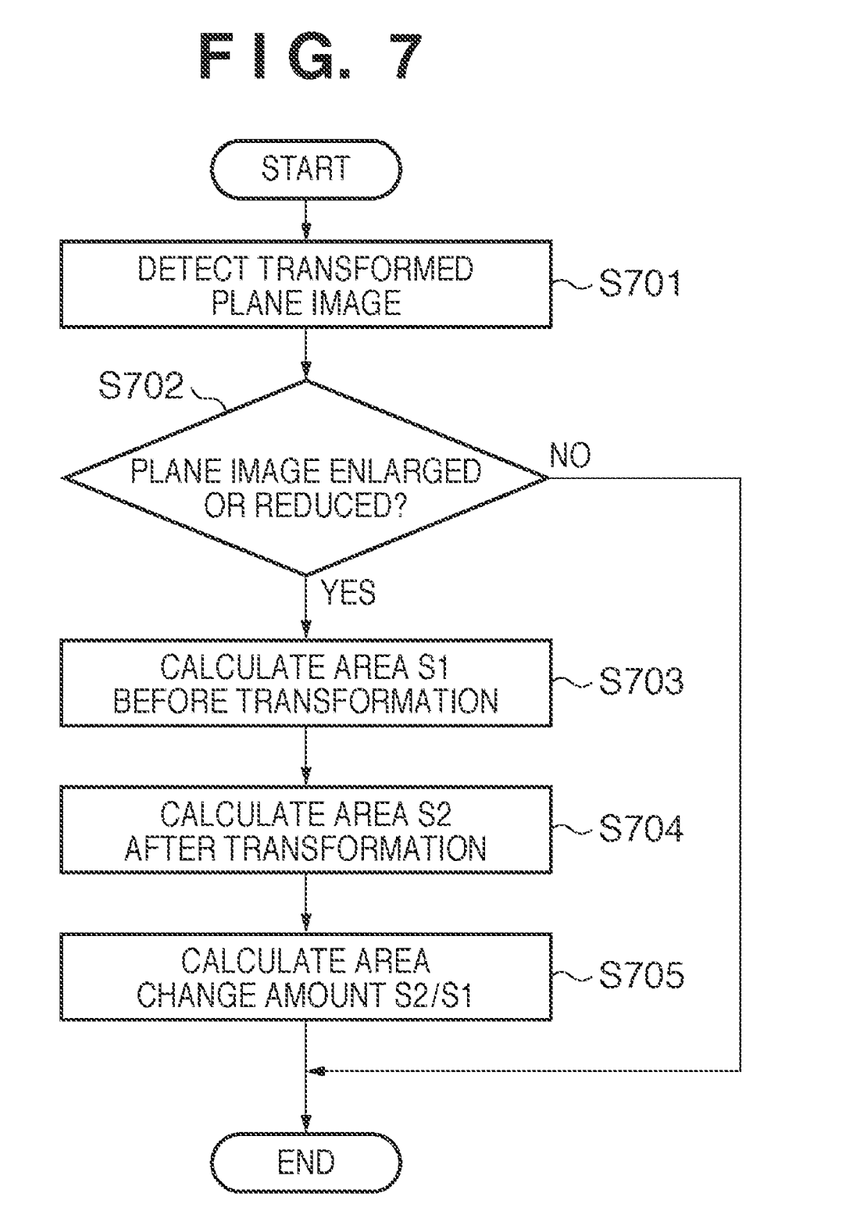
FIG. 7 is a flowchart for illustrating the calculation of the area-change amount.

Calculation of the area-change amount (step S308) will be explained with reference to the flowchart of FIG. 7.

When the enlargement/reduction process is done, the area of an enlarged/reduced plane image changes. The CPU 111 detects the transformed plane image (step S701), and determines whether the detected plane image has been enlarged or reduced (step S702). If the detected plane image has been enlarged or reduced, the CPU 111 calculates the area (for example, pixel count) S1 of the plane image before the transformation process (step S703), calculates the area S2 after the transformation process (step S704), and calculates the area-change amount S2/S1 (step S705).

When a layer containing the target region contains a plurality of plane images, these plane images are enlarged or reduced at the same ratio, so it suffices to calculate the area-change amount of one plane image. At this time, a high-precision area-change ratio can be obtained by calculating the area-change ratio of a plane image having a maximum area among a plurality of plane images, and setting it as the area-change ratio of the target region.

Calculation of Depth

Figure 8:
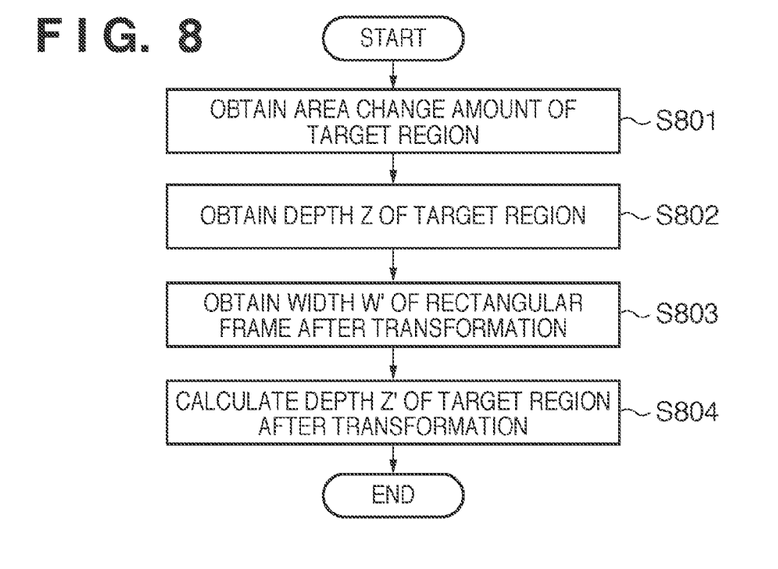
FIG. 8 is a flowchart for illustrating a process of calculating the depth after a transformation process from the area-change amount.

The process of calculating the depth after the transformation process from the area-change amount (step S309) will be explained with reference to the flowchart of FIG. 8.

The CPU 111 obtains the area-change amount of a target region (step S801), obtains the distance range (depth) Z of the target region (step S802), and obtains the width (length along the X-axis) W' of the rectangular frame after the transformation process (step S803). Then, the CPU 111 calculates the depth Z' of the target region after the transformation process (depth after the transformation process) in accordance with equation (1) (step S804):

$$W \times Z = W' \times Z' \quad (1)$$
$$= \sqrt{(S2/S1)} W \times Z'$$
$$Z' = \sqrt{(S1/S2)} Z$$

where W is the width of the rectangular frame of the target region before the transformation process, and S2/S1 is the area-change ratio.

Figure 9A:
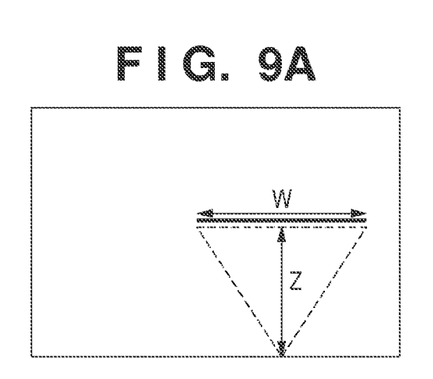
FIGS. 9A to 9C are views for illustrating the calculation of the depth after the transformation process.
Figure 9B:
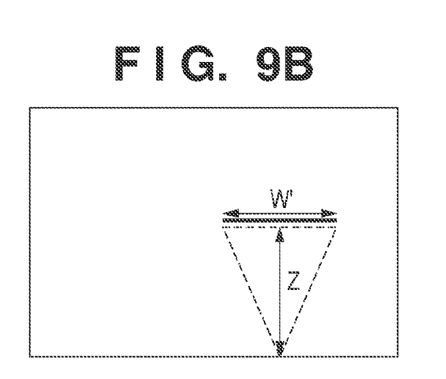
Figure 9C:
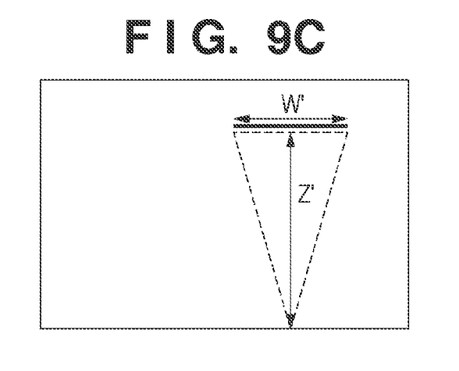

Calculation of the depth after the transformation process will be explained with reference to FIGS. 9A to 9C. FIG. 9A shows a triangle corresponding to the depth Z and the width W of a rectangular frame before the transformation process. FIG. 9B shows a triangle corresponding to the depth Z and the width W' of a rectangular frame after the transformation process. More specifically, the CPU 111 calculates the depth Z' at which the areas of the triangles before and after the transformation process coincide with each other (FIG. 9C). Note that the height (length along the Y-axis) H of the rectangular frame may be used instead of the width W.

Blur Function

Figure 10:
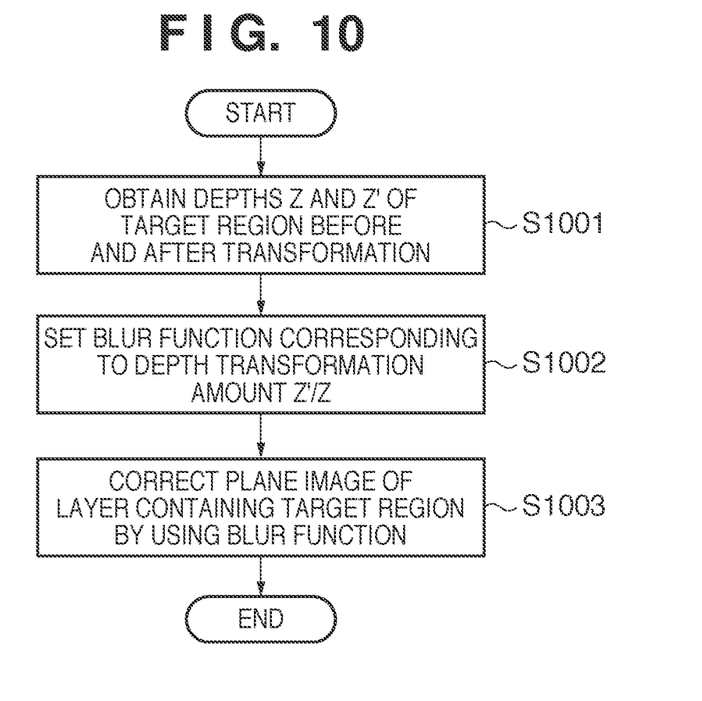
FIG. 10 is a flowchart for illustrating a process of setting a blur function.

The process of setting a blur function (step S310) will be explained with reference to the flowchart of FIG. 10. Although the blur function is set using, for example, a simulation model which simulates the degree of blur of the lens, it may be set by another method.

The CPU 111 obtains the depths Z and Z' of a target region before and after the transformation process (step S1001), and sets a blur function corresponding to the depth-change amount Z'/Z (step S1002). For example, the blur correction strength is increased for Z'/Z>1 (reduction), and decreased for Z'/Z<1 (enlargement). By using the set blur function, the CPU 111 corrects the plane image of a layer containing the target region (step S1003).

Processing using not only a change of the depth but also information of the focal length of the photographing lens when the image was captured is also possible. For example, when the change from the depth Z to Z' corresponds to movement from a long focal length to a short focal length, a sharpness process is performed at a correction strength corresponding to the depth-change amount. When the change from the depth Z to Z' corresponds to movement from a short focal length to a long focal length, a blur process is executed at a correction strength corresponding to the depth-change amount.

All plane images contained in the layer may undergo the blur (or sharpness) process at the same correction strength. Alternatively, the blur (or sharpness) process may be done at a correction strength corresponding to the depth of each layer or each region. For example, when the number of layers is small, like the short range, the middle range, and the distant range, regions having different depths may exist on the same layer. In particular, the depth difference in the short range or the middle range may greatly affect the image impression. Thus, based on distance information added to or associated with image data of a captured image, region division in a layer is executed, and an appropriate correction strength is set for each region.

In this way, a captured image is divided into regions using the distance information, and depth information is added to a layer containing a plane image corresponding to each divided region, generating image data in the 2.5D space. When the composition is changed by transforming the region of the captured image, the captured image is sometimes observed as if the depth of the transformed region changed. To prevent this, the depth-change amount is calculated, and the blur process or sharpness process is done in accordance with the depth-change amount. At this time, the image data in the 2.5D space is handled, so the processing load can be suppressed compared to handling image data in the 3D space. The editing function of reconstructing the composition can therefore be assembled into an image input device such as a digital camera. For example, when the user forgets to take an effective long shot, he can generate a long shot image from a captured image in video editing using the editing function of reconstructing the composition.

Second Embodiment

An image processing apparatus and method according to the second embodiment of the present invention will be described below. In the second embodiment, the same reference numerals as those in the first embodiment denote the same parts, and a detailed description thereof will not be repeated.

The first embodiment has described an example of reducing unnaturalness of an image after the transformation process by performing the blur process or sharpness process at a correction strength corresponding to the depth-change amount of a target region along with transformation of the target region. The second embodiment will explain an example of changing the color tone in accordance with the depth-change amount. For example, when the region is reduced to move in the direction of depth, the saturation of the region is decreased to reduce the extent of the unnaturalness in the appearance of an image after the transformation process.

Figure 11:
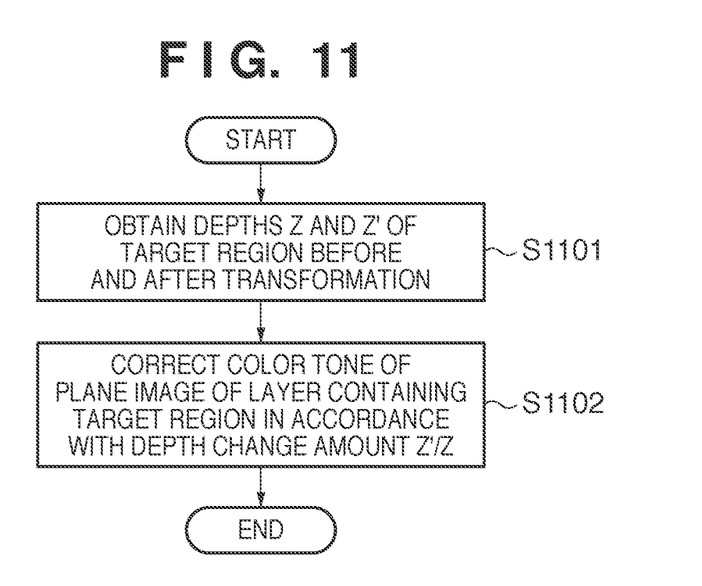
FIG. 11 is a flowchart for illustrating a correction process according to the second embodiment.

A correction process according to the second embodiment will be explained with reference to the flowchart of FIG. 11. In the process of the second embodiment, "color tone correction process" replaces "correction process using the blur function" in step S310 shown in FIG. 3.

A CPU 111 obtains the depths Z and Z' of a target region before and after the transformation process (step S1101). The CPU 111 performs correction to decrease the saturation of a plane image in a layer containing the target region for the depth-change amount Z'/Z>1 (reduction), and increase it for Z'/Z<(enlargement) (step S1102). In the second embodiment, the correction strength is proportional to the depth-change amount Z'/Z.

The contrast of a target region may be changed in accordance with the depth-change amount. More specifically, the CPU 111 performs correction to decrease the contrast of the target region for the depth-change amount Z'/Z>1 (reduction), and increase it for Z'/Z<1 (enlargement) (step S1102).

Also, the saturation and lightness of a target region may be changed in accordance with the depth-change amount. More specifically, the CPU 111 performs correction to decrease the saturation and lightness of the target region for the depth-change amount Z'/Z>1 (reduction), and increase them for Z'/Z<1 (enlargement) (step S1102).

Third Embodiment

An image processing apparatus and method according to the third embodiment of the present invention will be described below. In the third embodiment, the same reference numerals as those in the first and second embodiments denote the same parts, and a detailed description thereof will not be repeated.

The third embodiment will explain an example of performing correction corresponding to the motion of a target region in captured video. More specifically, the extent of the unnaturalness in the appearance of an image after the transformation process is reduced by changing the motion amount in accordance with the depth-change amount of the target region upon transformation of the target region. For example, the amplitude of the motion in a region where a motion blur occurs owing to the motion of a capturing target, such as a rippling water surface or leaves dancing in the wind, is corrected in accordance with the depth-change amount. Note that the correction can be applied in accordance with the depth-change amount to any moving subject in addition to a motion blur or subject swing.

Figure 12:
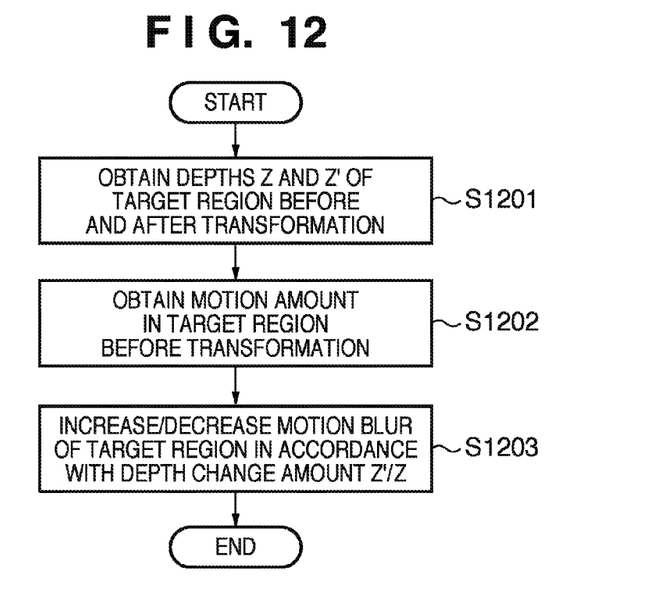
FIG. 12 is a flowchart for illustrating a correction process according to the third embodiment.

A correction process according to the third embodiment will be explained with reference to the flowchart of FIG. 12. In the process of the third embodiment, "correction process corresponding to the motion" replaces "correction process using the blur function" in step S310 shown in FIG. 3.

A CPU 111 obtains the depths Z and Z' of a target region before and after the transformation process (step S1201), and obtains the motion amount in the target region (plane image) before the transformation process (step S1202). To obtain the motion amount, it suffices to calculate the difference between the target region of the frame of interest and that of a frame preceding or succeeding the frame of interest. As for the direction of the motion blur, the target region undergoes an emphasis (sharpness) process, and a line segment which appears as a result of edge detection is obtained by Hough transformation. This line segment indicates the direction of the motion blur.

Then, the CPU 111 performs correction to decrease the motion blur of the target region for the depth-change amount $Z'/Z>1$ (reduction), and increase it for $Z'/Z<1$ (enlargement) (step S1203). In the third embodiment, the correction strength is proportional to the depth-change amount $Z'/Z$.

Fourth Embodiment

An image processing apparatus and method according to the fourth embodiment of the present invention will be described below. In the fourth embodiment, the same reference numerals as those in the first to third embodiments denote the same parts, and a detailed description thereof will not be repeated.

In the fourth embodiment, a grain, noise, or the like present in a target region before the transformation process is felt to be unnatural if its size changes along with enlargement/reduction of the target region. Especially for a moving image, the extent of the unnaturalness in appearance increases if the size of the grain or noise changes between frames. Note that the grain or noise arises from a capturing device, such as the photographing lens or sensor, or is added later as an effect by an image process.

Figure 13:
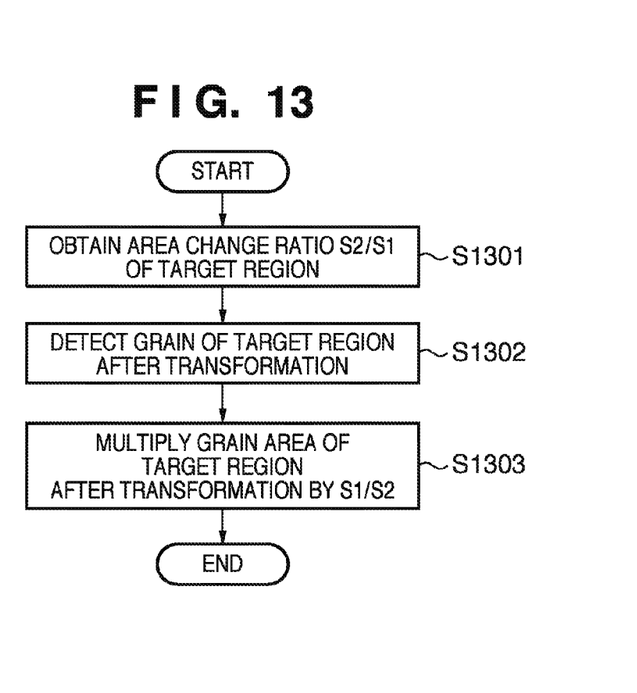
FIG. 13 is a flowchart for illustrating a correction process according to the fourth embodiment.

A correction process according to the fourth embodiment will be explained with reference to the flowchart of FIG. 13. In the process of the fourth embodiment, "correction process corresponding to the grain or noise size" replaces "correction process using the blur function" in step S310 shown in FIG. 3.

A CPU 111 obtains the area-change amount S2/S1 of a target region (step S1301), and detects the grain or the like of the target region after the transformation process (step S1302). It suffices to detect the grain or the like from the difference in the target region before and after applying a median filter or the like used in a noise-detection process and noise-removal process.

After that, the CPU 111 multiplies the area of the grain or the like in the target region after the transformation process by S1/S2 (step S1303). More specifically, the vertical and horizontal lengths of the grain or the like are multiplied by $\sqrt{(S1/S2)}$ to keep the grain or the like at the same size as that before the transformation process. It is also possible to perform a grain-removal process for the target region after the transformation process, and superimpose, at a position after the transformation process, a grain detected from the target region before the transformation process.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-120962, filed May 26, 2010, which is hereby incorporated by reference herein in its entirety.

What is claimed is:

1. An image processing apparatus for processing an image constructed from a plurality of plane images, each of which has distance information indicating a shooting distance, comprising:
   an obtaining unit configured to obtain the distance information from a target plane image including at least one subject;
   a calculating unit configured to calculate an area change amount of the target plane image in a case where a transformation process corresponding to an enlargement or reduction is performed on the target plane image;
   a determiner configured to determine a depth change amount of the transformed plane image based on the distance information and the area change amount; and
   a corrector configured to perform a correction process for the image in accordance with a correction strength determined as proportional to the depth change amount.

2. The apparatus according to claim 1, further comprising:
   an arranging section configured to divide an original image into regions using the distance information added to the original image to generate a plane image of each region, and to arrange each plane image on a layer corresponding to a shooting distance range in accordance with distance information of the plane image; and
   a selecting unit configured to select the target plane image including the at least one subject.

3. The apparatus according to claim 2, further comprising a transforming unit configured to perform the transformation process for a plane image.

4. The apparatus according to claim 3, wherein the determiner calculates a shooting distance with respect to a width of a plane image after the transformation process using the area change amount to make products of widths and shooting distances of the plane image before and after the transformation process coincide with each other, and determines, as the depth change amount, a ratio of the shooting distance before the transformation process and the shooting distance after the transformation process.

5. The apparatus according to claim 2, wherein the corrector performs the correction process for a plane image of a layer containing the target plane image.

6. The apparatus according to claim 5, wherein the corrector corrects, in accordance with the correction strength, a blur amount of at least the target plane image out of plane images contained in the layer.

7. The apparatus according to claim 5, wherein the corrector corrects, in accordance with the correction strength, a color tone of at least the target plane image out of plane images contained in the layer.

8. The apparatus according to claim 5, wherein the corrector corrects, in accordance with the correction strength, a motion blur of at least the target plane image out of plane images contained in the layer.

9. The apparatus according to claim 5, wherein the corrector corrects, in accordance with the correction strength, a grain size and noise size of at least the target plane image out of plane images contained in the layer.

10. The apparatus according to claim 1, further comprising a controller configured to control read/write from/in a memory card to input image data of the captured image from the memory card and store, in the memory card, image data output from the corrector.

11. An image processing method of processing an image constructed from a plurality of plane images, each of which has distance information indicating a shooting distance, the method comprising:

using a processor to perform the steps of:

obtaining the distance information from a target plane image including at least one subject;

calculating an area change amount of the target plane image in a case where a transformation process corresponding to an enlargement or reduction is performed on the target plane image;

determining a depth change amount of the transformed plane image based on the distance information and the area change amount; and performing a correction process for the image in accordance with a correction strength determined as proportional to the depth change amount.

12. A non-transitory computer-readable medium storing a computer-executable program for causing a computer to perform an image processing method of processing an image constructed from a plurality of plane images, each of which has distance information indicating a shooting distance, the method comprising the steps of:

obtaining the distance information from a target plane image including at least one subject;

calculating an area change amount of the target plane image in a case where a transformation process corresponding to an enlargement or reduction is performed on the target plane image;

determining a depth change amount of the transformed plane image based on the distance information and the area change amount; and performing a correction process for the image in accordance with a correction strength determined as proportional to the depth change amount.

13. The apparatus according to claim 1, wherein the determiner determines the depth changing amount using a calculation regarding the area change amount and the distance information.

* * * * *